(12) United States Patent
Takahama et al.

(10) Patent No.: US 11,459,735 B2
(45) Date of Patent: Oct. 4, 2022

(54) DISPLAY CONTROL SYSTEM, DISPLAY CONTROL DEVICE, AND DISPLAY CONTROL METHOD

(71) Applicant: KOMATSU LTD., Tokyo (JP)

(72) Inventors: Kazuhisa Takahama, Tokyo (JP); Yukinori Matsumura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/048,695

(22) PCT Filed: Mar. 13, 2019

(86) PCT No.: PCT/JP2019/010160
§ 371 (c)(1),
(2) Date: Oct. 19, 2020

(87) PCT Pub. No.: WO2020/003633
PCT Pub. Date: Jan. 2, 2020

(65) Prior Publication Data
US 2021/0189697 A1 Jun. 24, 2021

(30) Foreign Application Priority Data
Jun. 29, 2018 (JP) .............................. JP2018-125424

(51) Int. Cl.
*E02F 9/26* (2006.01)
*H04N 13/122* (2018.01)
*H04N 13/302* (2018.01)

(52) U.S. Cl.
CPC .......... *E02F 9/265* (2013.01); *H04N 13/122* (2018.05); *H04N 13/302* (2018.05)

(58) Field of Classification Search
CPC .......... E02F 9/265; E02F 9/26; H04N 13/122; H04N 13/302; H04N 13/30; H04N 7/18;
(Continued)

(56) References Cited

U.S. PATENT DOCUMENTS

| | | | | |
|---|---|---|---|---|
| 5,850,341 A | * | 12/1998 | Fournier | ................ G01C 21/00 701/50 |
| 2013/0222573 A1 | * | 8/2013 | Onuma | .................... H04N 7/18 348/82 |

(Continued)

FOREIGN PATENT DOCUMENTS

| | | |
|---|---|---|
| EP | 3 343 171 A1 | 8/2016 |
| JP | 2013-36243 A | 2/2013 |

(Continued)

OTHER PUBLICATIONS

The International Search Report for the corresponding international application No. PCT/JP2019/010160, dated May 21, 2019.

*Primary Examiner* — Tung T Vo
(74) *Attorney, Agent, or Firm* — Global IP Counselors, LLP (57) ABSTRACT

A display control system includes a work machine and a display control device. The work machine includes work equipment, a depth detection device configured to detect a depth in a detection range and provided at a position where the work equipment does not interfere with the detection range, and a posture detection device configured to detect a posture of the work machine. The display control device includes a map generation unit configured to generate a three-dimensional map representing a shape around the work machine based on depth information generated by the depth detection device and posture information generated by the posture detection device, a depth image generation unit configured to generate a depth image representing a depth of a range including a position of the work equipment in the three-dimensional map, and a display control unit configured to output a display signal to display the depth image.

7 Claims, 8 Drawing Sheets

(58) Field of Classification Search
CPC ....... G06T 19/006; G06T 7/521; G06T 7/593;
G06T 19/00; G09G 5/00; G09G 5/36;
G09G 5/377
USPC .......................................................... 348/42
See application file for complete search history.

(56) References Cited

U.S. PATENT DOCUMENTS

| | | | |
|---|---|---|---|
| 2015/0381971 A1* | 12/2015 | Wu | G02B 30/30 |
| | | | 348/54 |
| 2016/0035149 A1 | 2/2016 | Friend | |
| 2016/0328833 A1* | 11/2016 | Kiyota | H04N 5/23293 |
| 2016/0353049 A1* | 12/2016 | Maley | G06T 11/20 |
| 2017/0089042 A1* | 3/2017 | Machida | H04N 5/272 |
| 2017/0298595 A1* | 10/2017 | Machida | E02F 9/261 |
| 2018/0051446 A1* | 2/2018 | Yoshinada | E02F 9/205 |
| 2018/0058044 A1* | 3/2018 | Deguchi | H04N 7/181 |
| 2018/0079361 A1 | 3/2018 | Yamashita et al. | |
| 2018/0155902 A1* | 6/2018 | Fujita | E02F 9/26 |
| 2018/0192019 A1* | 7/2018 | Fujita | B60Q 9/00 |
| 2018/0245314 A1* | 8/2018 | Yamaguchi | E02F 9/26 |
| 2018/0251961 A1* | 9/2018 | France | E02F 3/32 |
| 2019/0024348 A1* | 1/2019 | Hiekata | E02F 9/267 |
| 2019/0277004 A1* | 9/2019 | Hashimoto | E02F 9/24 |
| 2019/0281264 A1* | 9/2019 | Fujita | H04N 9/3179 |
| 2019/0308502 A1* | 10/2019 | Yoneyama | B60S 1/04 |
| 2019/0330825 A1 | 10/2019 | Tanimoto et al. | |
| 2019/0360176 A1* | 11/2019 | Shimoda | E02F 9/261 |
| 2019/0364258 A1* | 11/2019 | Sumi | H04N 13/376 |
| 2020/0032489 A1* | 1/2020 | Yamazaki | E02F 9/20 |
| 2020/0058177 A1* | 2/2020 | Kawamoto | G01C 7/02 |
| 2020/0291614 A1* | 9/2020 | Kiyota | B60R 11/02 |
| 2020/0299924 A1* | 9/2020 | Kurokawa | E02F 9/24 |
| 2021/0010244 A1* | 1/2021 | Ito | G02B 27/0172 |
| 2021/0025131 A1* | 1/2021 | Sasaki | G05D 1/0016 |
| 2021/0087794 A1* | 3/2021 | Yamamoto | E02F 9/24 |

FOREIGN PATENT DOCUMENTS

| | | |
|---|---|---|
| JP | 2016-160741 A | 9/2016 |
| JP | 2018-35645 A | 3/2018 |
| JP | 2018-50119 A | 3/2018 |
| WO | 2017/033991 A1 | 3/2017 |

\* cited by examiner

DISPLAY CONTROL SYSTEM, DISPLAY CONTROL DEVICE, AND DISPLAY CONTROL METHOD

CROSS-REFERENCE TO RELATED APPLICATIONS

This application is a U.S. National stage application of International Application No. PCT/JP2019/010160, filed on Mar. 13, 2019. This U.S. National stage application claims priority under 35 U.S.C. § 119(a) to Japanese Patent Application No. 2018-125424, filed in Japan on Jun. 29, 2018, the entire contents of which are hereby incorporated herein by reference.

BACKGROUND

Field of the Invention

The present invention relates to a display control system, a display control device, and a display control method.

Background Information

Japanese Unexamined Patent Application, First Publication, No. 2016-160741 provides an imaging device and a distance detection device (depth detection device) in a front portion of a work machine and discloses a technique of displaying by superimposing a grid indicating a distance on an image captured by the imaging device in order to cause an operator to have a sense of perspective when the work machine is performed remote operation.

SUMMARY

According to the technique disclosed in Japanese Unexamined Patent Application, First Publication, No. 2016-160741, the distance detection device is provided in the front portion of the work machine for detecting the distance in an imaging range of the imaging device. The imaging range of the imaging device includes work equipment. Therefore, the distance detection device cannot detect a distance of a portion of a construction target that is in a shadow of the work equipment.

An object of the present invention is to provide a display control system, a display control device, and a display control method that solve the above-described problems.

An aspect of the present invention provides a display control system including a work machine and a display control device, wherein the work machine comprises: work equipment; a depth detection device configured to detect a depth in a detection range and provided at a position where the work equipment does not interfere with the detection range; and a posture detection device configured to detect a posture of the work machine, and wherein the display control device comprises: a map generation unit configured to generate a three-dimensional map representing a shape around the work machine based on depth information generated by the depth detection device and posture information generated by the posture detection device; a depth image generation unit configured to generate a depth image representing a depth of a range including a position of the work equipment in the three-dimensional map; and a display control unit configured to output a display signal for displaying the depth image.

According to the above aspect, the display control system can display the depth image representing a depth of the construction target in the range including the work equipment.

DETAILED DESCRIPTION OF EMBODIMENT(S)

First Embodiment

Work System

Figure 1:
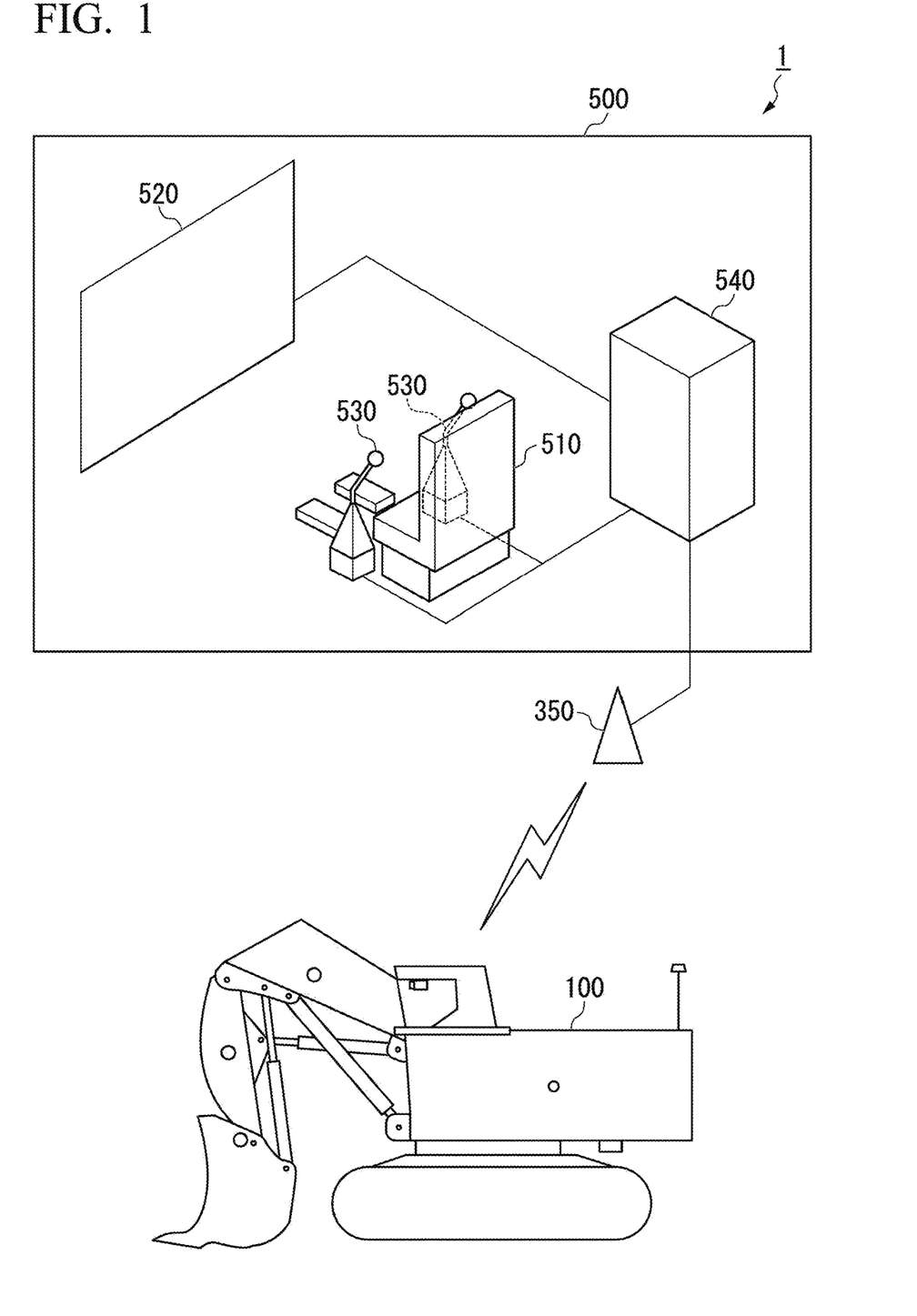
FIG. 1 is a schematic view illustrating a configuration of a remote operation system according to a first embodiment.

FIG. 1 is a schematic view illustrating a configuration of a remote operation system according to a first embodiment.

A work system 1 includes a work machine 100 and a remote operation room 500. The work machine 100 operates at a work site (for example, a mine and a quarry). The remote operation room 500 is provided at a location away from the work site (for example, a city and an inside of the work site). That is, an operator performs remote operation of the work machine 100 from a distance where the work machine 100 cannot be visually recognized.

The work machine 100 is performed remote operation based on an operation signal transmitted from the remote operation room 500. The work machine 100 and the remote operation room 500 are connected to each other through communication via an access point 350. The operation signal indicating operation by the operator, which is received from the remote operation room 500, is transmitted to the work machine 100 via the access point 350. The work machine 100 operates based on the operation signal received from the remote operation room 500. That is, the work system 1 includes a remote operation system configured by the work machine 100 and the remote operation room 500. The access point 350 is used in communication of the remote operation system. In addition, the work machine 100 captures an image of a construction target, and the image is displayed in the remote operation room 500. That is, the work system 1 is an example of a display control system.

Work Machine

Figure 2:
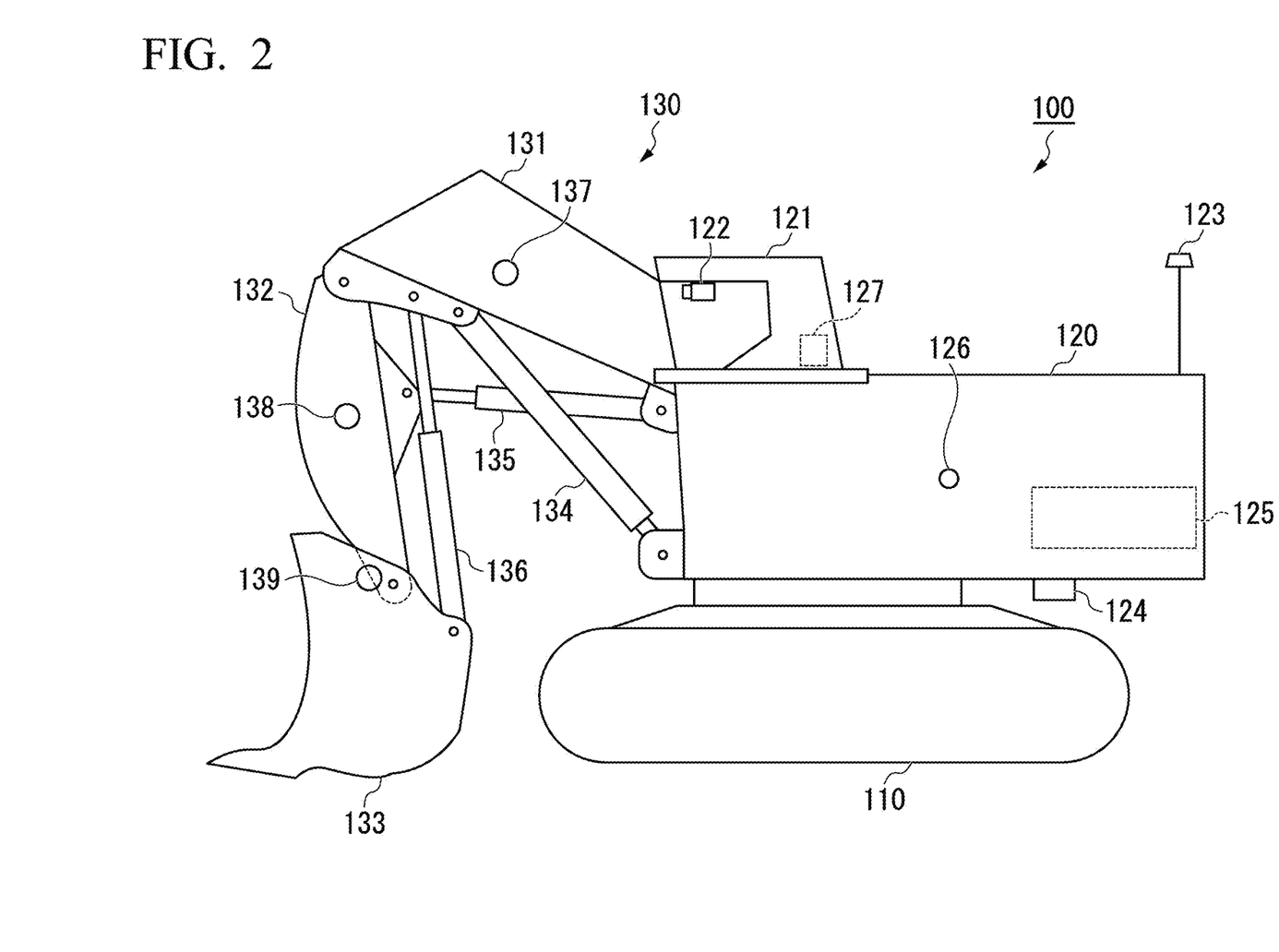
FIG. 2 is an external view of a work machine according to the first embodiment.

FIG. 2 is an external view of the work machine according to the first embodiment.

The work machine 100 according to the first embodiment is a hydraulic excavator. In addition, the work machine 100 according to another embodiment may be a loading machine other than a hydraulic excavator, such as a wheel loader. Although the work machine 100 illustrated in FIG. 2 is a face shovel, the work machine 100 may be a backhoe shovel or a rope shovel.

The work machine 100 includes a travel body 110, a swing body 120 that is supported by the travel body 110, and work equipment 130 that is operated by a hydraulic pressure and is supported by the swing body 120. The swing body 120 is supported to be swingable about a swing center O (refer to FIG. 5). The work equipment 130 is provided at a front portion of the swing body 120.

The work equipment 130 includes a boom 131, an arm 132, and a bucket 133. The work equipment 130 is driven as a boom cylinder 134, an arm cylinder 135, and a bucket cylinder 136 expand and contract. A boom angle sensor 137, an arm angle sensor 138, and a bucket angle sensor 139 are respectively mounted on the boom 131, the arm 132, and the bucket 133.

A base end portion of the boom 131 is attached to the swing body 120 via a pin.

The arm 132 connects the boom 131 to the bucket 133. A base end portion of the arm 132 is attached to a tip portion of the boom 131 via a pin.

The bucket 133 includes a blade for excavating earth and a container for accommodating the excavated earth. A base end portion of the bucket 133 is attached to a tip portion of the arm 132 via a pin.

The boom cylinder 134 is a hydraulic cylinder for operating the boom 131. A base end portion of the boom cylinder 134 is attached to the swing body 120. A tip portion of the boom cylinder 134 is attached to the boom 131.

The arm cylinder 135 is a hydraulic cylinder for driving the arm 132. A base end portion of the arm cylinder 135 is attached to the boom 131. A tip portion of the arm cylinder 135 is attached to the arm 132.

The bucket cylinder 136 is a hydraulic cylinder for driving the bucket 133. A base end portion of the bucket cylinder 136 is attached to the boom 131. A tip portion of the bucket cylinder 136 is attached to the bucket 133.

The boom angle sensor 137 is attached to the boom 131 and detects an inclination angle of the boom 131.

The arm angle sensor 138 is attached to the arm 132 and detects an inclination angle of the arm 132.

The bucket angle sensor 139 is attached to the bucket 133 and detects an inclination angle of the bucket 133.

The boom angle sensor 137, the arm angle sensor 138, and the bucket angle sensor 139 according to the first embodiment each detect an inclination angle with respect to a horizontal plane. An angle sensor according to another embodiment is not limited thereto and may detect an inclination angle with respect to another reference plane. For example, in another embodiment, an angle sensor may detect a relative rotation angle by a potentiometer provided at each of the base end portions of the boom 131, the arm 132, and the bucket 133, or may detect an inclination angle by measuring a cylinder length of each of the boom cylinder 134, the arm cylinder 135, and the bucket cylinder 136 and converting the cylinder length into an angle.

Figure 3:
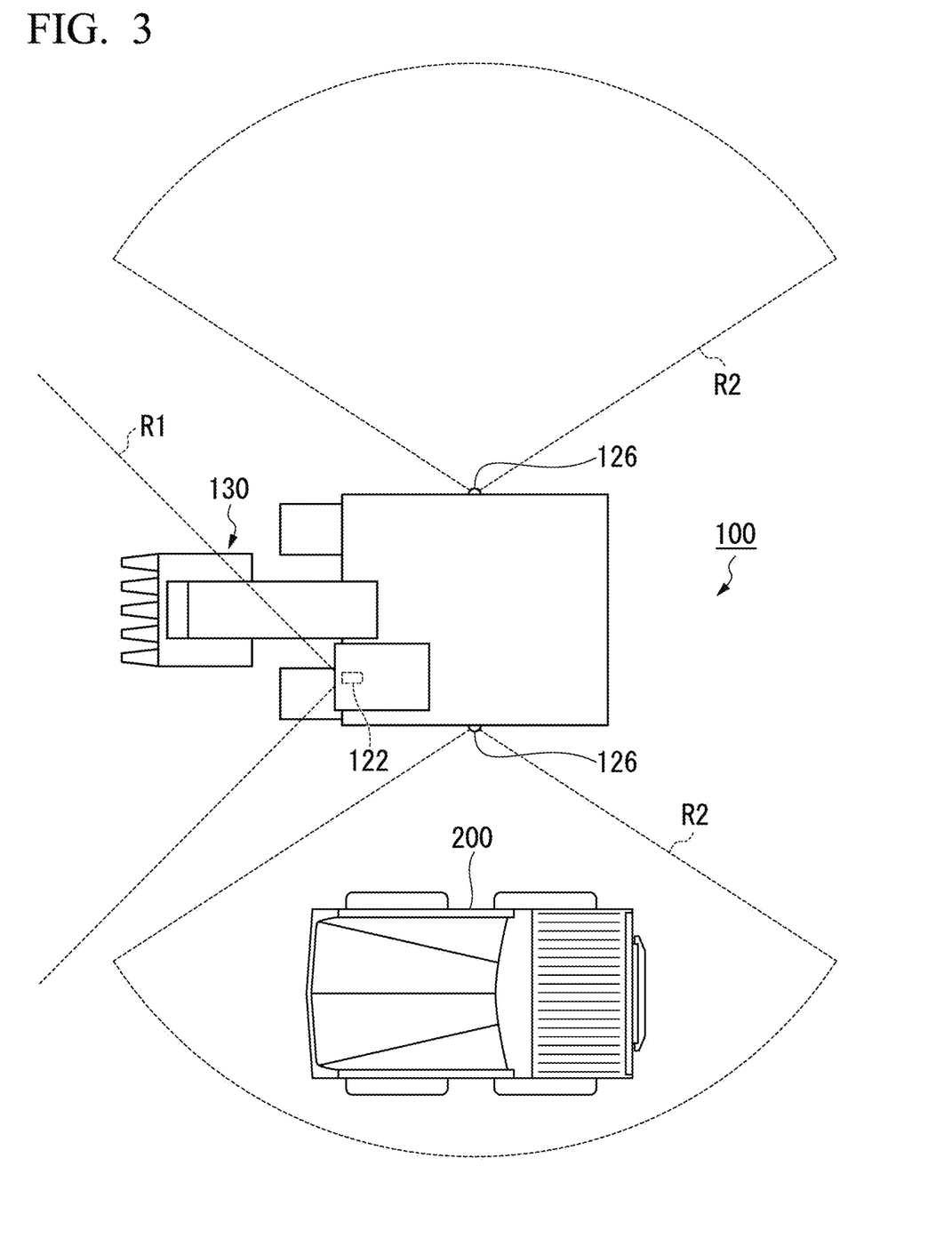
FIG. 3 is a top view illustrating provision positions of an imaging device and a depth detection device in the work machine according to the first embodiment.

FIG. 3 is a top view illustrating provision positions of an imaging device and a depth detection device in the work machine according to the first embodiment.

The swing body 120 includes a cab 121. The cab 121 is provided with an imaging device 122. The imaging device 122 is provided in an upper front portion in the cab 121. The imaging device 122 captures an image of the front of the cab 121 through a windshield in a front portion of the cab 121. Herein, the "front" refers to a direction in which the work equipment 130 is mounted on the swing body 120, and the "rear" refers to a direction opposite to the "front". The "side" refers to a direction (right-and-left direction) intersecting the front-and-rear direction. An example of the imaging device 122 includes an imaging device using a charge coupled device (CCD) sensor and a complementary metal oxide semiconductor (CMOS) sensor. In another embodiment, the imaging device 122 may not necessarily have to be provided in the cab 121, and it is sufficient that the imaging device 122 be provided at a position where at least a construction target and the work equipment 130 can be imaged as illustrated in FIG. 3. That is, an imaging range R1 of the imaging device 122 includes at least part of the work equipment 130.

The work machine 100 includes the imaging device 122, a position and azimuth direction calculator 123, an inclination measuring instrument 124, a hydraulic device 125, a depth detection device 126, and a control device 127.

The position and azimuth direction calculator 123 calculates a position of the swing body 120 and an azimuth direction in which the swing body 120 faces. The position and azimuth direction calculator 123 includes two receivers that receive positioning signals from an artificial satellite that configures GNSS. The two receivers are provided at positions different from each other on the swing body 120. The position and azimuth direction calculator 123 detects a position of a representative point of the swing body 120 in a site coordinate system (the origin of an excavator coordinate system) based on the positioning signals received by the receivers.

The position and azimuth direction calculator 123 uses respective positioning signals received by the two receivers to calculate an azimuth direction in which the swing body 120 faces as a relationship between a provision position of one receiver and a provision position of the other receiver.

In another embodiment, the position and azimuth direction calculator 123 may detect an azimuth direction in which the swing body 120 faces based on a measurement value of a rotary encoder or an IMU.

The inclination measuring instrument 124 measures the acceleration and angular speed of the swing body 120 and detects a posture (for example, a roll angle, a pitch angle, a yaw angle) of the swing body 120 based on the measurement result. The inclination measuring instrument 124 is provided, for example, on a lower surface of the swing body 120. The inclination measuring instrument 124 can use, for example, an inertial measurement unit (IMU).

The hydraulic device 125 includes a hydraulic oil tank, a hydraulic pump, and a flow rate control valve. The hydraulic pump is driven by the power of an engine (not illustrated) and supplies a hydraulic oil to the boom cylinder 134, the arm cylinder 135, and the bucket cylinder 136 via the flow rate control valve. The flow rate control valve has a rod-shaped spool and adjusts the flow rate of the hydraulic oil supplied to the boom cylinder 134, the arm cylinder 135, and the bucket cylinder 136 depending on a position of the spool. The spool is driven based on a control command received from the control device 127. That is, the amount of hydraulic oil supplied to the boom cylinder 134, the arm cylinder 135, and the bucket cylinder 136 is controlled by the control device 127.

The depth detection device 126 detects a depth in a detection range R2. The depth detection device 126 is provided on both side surfaces of the swing body 120 and detects the depth of the surrounding object including the construction object in the detection range R2 centered on an axis extending in the width direction of the swing body 120. The depth is a distance from the depth detection device 126 to a target. Accordingly, when the work machine 100 excavates earth with the work equipment 130, the depth detection device 126 can detect the depth of a transport vehicle 200 that is stopped to the side of the work machine 100 and is a target to be loaded with the earth. In addition, when the work machine 100 changes a facing direction of the swing body 120 by a swing motion and loads the earth onto the transport vehicle 200, the depth detection device 126 can detect the depth of the construction target. That is, since the direction of the depth detection device 126 changes by the swing operation of the work machine 100 in the excavating-loading operation, the depth detection device 126 can detect the surroundings of the work machine 100 over a wide range.

As illustrated in FIG. 3, the depth detection device 126 is provided at a position where the work equipment 130 does not interfere with the detection range R2. Examples of the depth detection device 126 include a LiDAR device, a radar device, and a stereo camera.

The control device 127 transmits, to the remote operation room 500, an image captured by the imaging device 122, the swinging speed, position, azimuth direction, and inclination angle of the swing body 120, inclination angles of the boom 131, the arm 132, and the bucket 133, the traveling speed of the travel body 110, and depth information detected by the depth detection device 126. Hereinafter, the position, the azimuth direction, and the inclination angle of the swing body 120 are also referred to as posture information indicating a posture of the work machine 100. That is, the position and azimuth direction calculator 123 and the inclination measuring instrument 124 are examples of the posture detection device.

The control device 127 receives an operation signal from the remote operation room 500. The control device 127 drives the work equipment 130, the swing body 120, or the travel body 110 based on the received operation signal.

Remote Operation Room

The remote operation room 500 includes an operator's seat 510, a display device 520, an operation device 530, and a control device 540.

The display device 520 is disposed in front of the operator's seat 510. The display device 520 is positioned in front of the operator's eyes when the operator sits in the operator's seat 510. The display device 520 may be configured by a plurality of arranged displays, or may be configured by one large display as illustrated in FIG. 1. In addition, the display device 520 may project an image on a curved surface or a spherical surface with a projector.

The operation device 530 is an operation device for the remote operation system. The operation device 530 generates, in response to operation by the operator, an operation signal of the boom cylinder 134, an operation signal of the arm cylinder 135, an operation signal of the bucket cylinder 136, a right-and-left swing operation signal of the swing body 120, and a travel operation signal of the travel body 110 for moving forward and backward and outputs the signals to the control device 540. The operation device 530 is configured by, for example, a lever, a knob switch, and a pedal (not illustrated).

The operation device 530 is disposed in the vicinity of the operator's seat 510. The operation device 530 is positioned within a range where the operator can operate when the operator sits in the operator's seat 510.

The control device 540 generates a display image based on information received from the work machine 100 and causes the display device 520 to display the display image. In addition, the control device 540 transmits an operation signal representing the operation of the operation device 530 to the work machine 100. The control device 540 is an example of a display control device.

Figure 4:
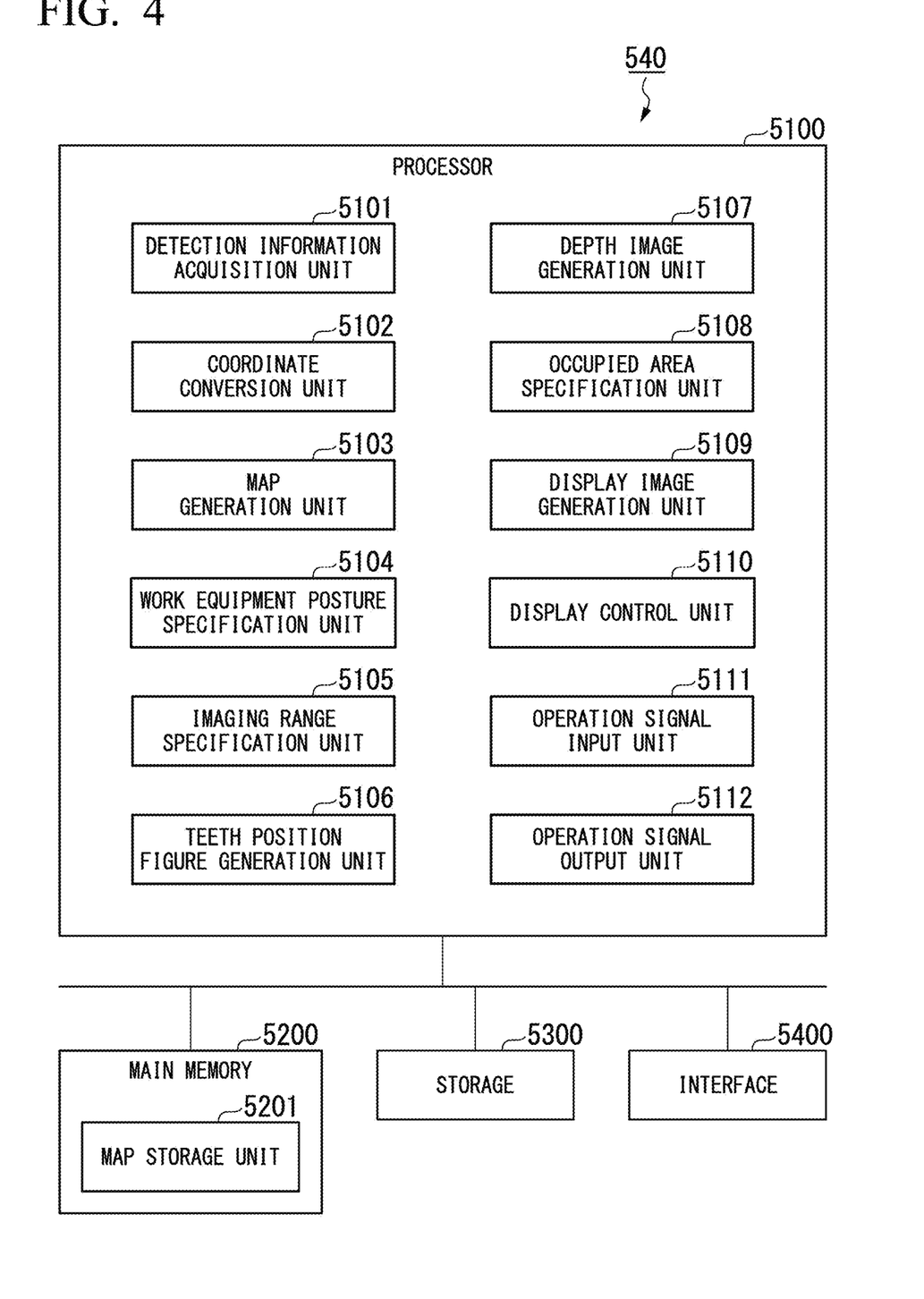
FIG. 4 is a schematic block diagram showing a configuration of a control device of a remote operation room according to the first embodiment.

FIG. 4 is a schematic block diagram showing a configuration of the control device of the remote operation room according to the first embodiment.

The control device 540 is a computer including a processor 5100, a main memory 5200, a storage 5300, and an interface 5400. The storage 5300 stores a program. The processor 5100 reads the program from the storage 5300 to develop the program in the main memory 5200 and executes processing in accordance with the program. The control device 540 is connected to a network via the interface 5400.

Examples of the storage 5300 include an HDD, an SSD, a magnetic disk, a magneto-optical disk, a CD-ROM, a DVD-ROM, and a semiconductor memory. The storage 5300 may be an internal medium directly connected to a common communication line of the control device 540, or may be an external medium connected to the control device 540 via the interface 5400. The storage 5300 is a non-transitory tangible storage medium.

By executing the program, the processor 5100 secures a storage area of a map storage unit 5201 in the main memory 5200.

The map storage unit 5201 stores a three-dimensional map showing a three-dimensional shape of a construction target. In the three-dimensional map, the coordinates of the construction target are represented in the site coordinate system.

By executing the program, the processor 5100 includes a detection information acquisition unit 5101, a coordinate conversion unit 5102, a map generation unit 5103, a work equipment posture specification unit 5104, an imaging range specification unit 5105, a teeth position figure generation unit 5106, a depth image generation unit 5107, an occupied area specification unit 5108, a display image generation unit 5109, a display control unit 5110, an operation signal input unit 5111, and an operation signal output unit 5112.

The detection information acquisition unit 5101 receives, from the control device 127, an image captured by the imaging device 122, the swinging speed, position, azimuth direction, and inclination angle of the swing body 120, the inclination angles of the boom 131, the arm 132, and the bucket 133, the traveling speed of the travel body 110, and depth information detected by the depth detection device 126. The detection information acquisition unit 5101 is an example of a depth acquisition unit and a posture acquisition unit.

The coordinate conversion unit 5102 converts the coordinate system of depth information into the site coordinate system based on the position, azimuth direction, and inclination angle of the swing body 120. A depth coordinate system, which represents the coordinate system of the depth information, is a relative coordinate system of which origin is the position of the depth detection device 126. The depth information converted into the site coordinate system represents a three-dimensional shape of a construction target in the detection range R2 of the depth detection device 126.

The map generation unit 5103 updates a portion of a three-dimensional map stored in the map storage unit 5201, which corresponds to the detection range R2 of the depth detection device 126, into a three-dimensional shape indicated by depth information which is converted into the site coordinate system by the coordinate conversion unit 5102. That is, the map generation unit 5103 generates a three-dimensional map representing the surrounding shape of the work machine 100 based on a combination of depth information and posture information which are obtained at different timings. The different timings may be, for example, a timing for each predetermined swinging angle, a timing for each predetermined cycle during a swinging operation, or a timing obtained by adding a timing before or after a swinging operation thereto.

The work equipment posture specification unit 5104 specifies the posture of the work equipment 130 in a vehicle body coordinate system based on the inclination angles of the boom 131, the arm 132, and the bucket 133. The vehicle body coordinate system is a relative coordinate system of which origin is the position of the swing body 120. Specifically, the work equipment posture specification unit 5104 acquires the coordinates and absolute angle of a tip of the boom 131 based on the inclination angle of the boom 131 and the known length of the boom 131 (a distance from the pin at the base end portion to the pin at the tip portion). Herein, the absolute angle refers to an angle of each of the boom 131, the arm 132, and the bucket 133 with the swing body 120 as reference. The absolute angle is acquired by adding a pitch angle detected by the inclination measuring instrument 124 to each of inclination angles detected by the boom angle sensor 137, the arm angle sensor 138, and the bucket angle sensor 139. Similarly, the work equipment posture specification unit 5104 acquires the coordinates and absolute angle of the tip of the arm 132 and the coordinates and absolute angle of the tip (teeth) of the bucket 133. The work equipment posture specification unit 5104 converts the coordinate system of the posture of the work equipment 130 into the site coordinate system based on the position, azimuth direction, and inclination angle of the swing body 120.

In another embodiment, the work equipment posture specification unit 5104 may calculate, based on cylinder lengths and known dimensions, a relative angle of the boom 131 with respect to the swing body 120, a relative angle of the arm 132 with respect to the boom 131, and a relative angle of the bucket 133 with respect to the arm 132 to specify the posture of the work equipment 130.

The imaging range specification unit 5105 specifies the imaging range R1 of the imaging device 122 based on the position, azimuth direction, and inclination angle of the swing body 120. Specifically, the imaging range specification unit 5105 specifies a position of the imaging device 122 and a direction of an optical axis of the imaging device 122 based on the position, azimuth direction, and inclination angle of the swing body 120. The imaging range specification unit 5105 can specify the imaging range R1 of the imaging device 122 based on the specified position, the specified direction of the optical axis, and a known angle of view of the imaging device 122.

Figure 5:
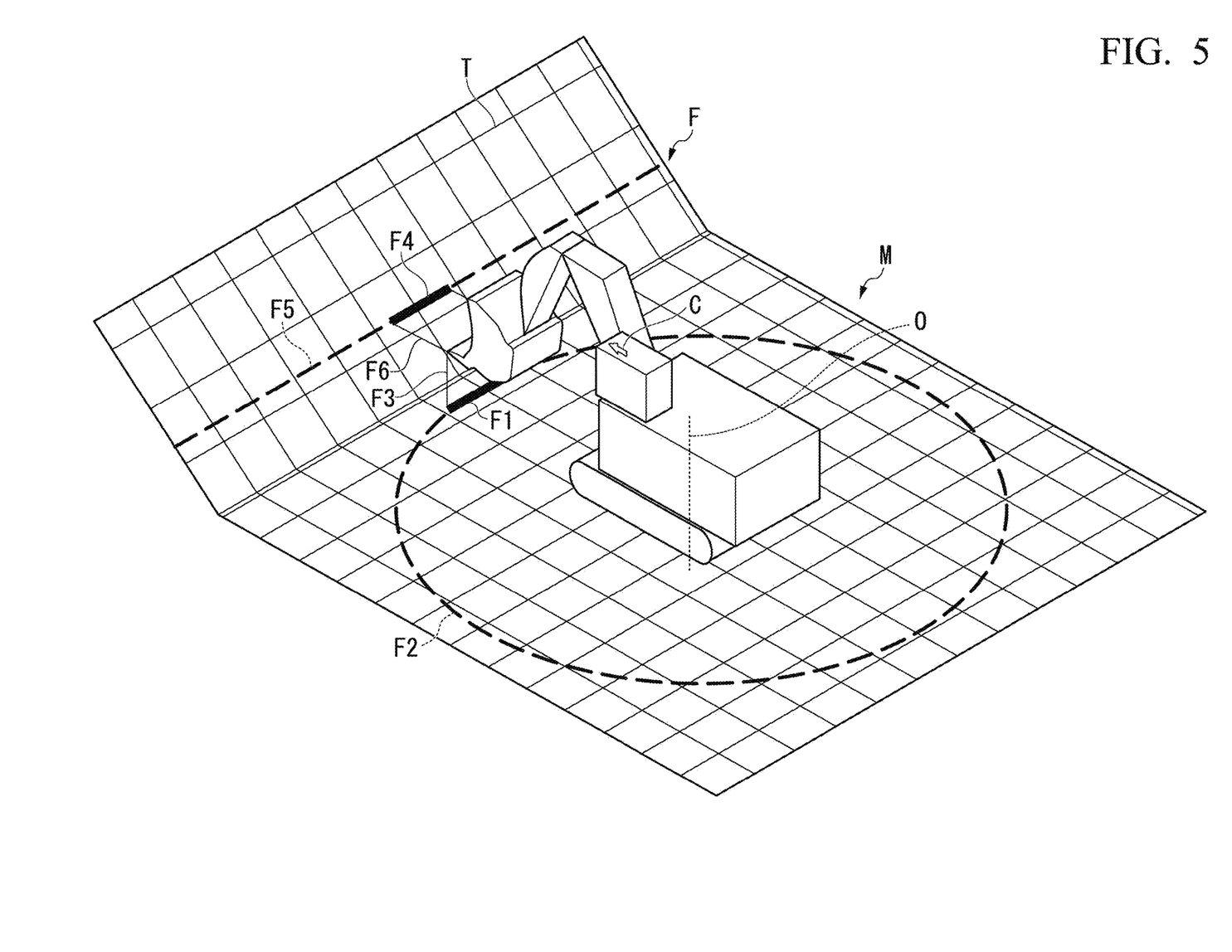
FIG. 5 is a view illustrating an example of a relationship between a three-dimensional map and a rendering camera in a virtual space.

FIG. 5 is a view illustrating an example of a relationship between a three-dimensional map and a rendering camera in a virtual space.

The imaging range specification unit 5105 determines a parameter of a rendering camera C for rendering a three-dimensional shape based on the specified imaging range. The rendering camera C is a virtual camera that shows a viewpoint for drawing a two-dimensional image from a three-dimensional shape disposed in the virtual space represented by the site coordinate system.

The teeth position figure generation unit 5106 generates a teeth position figure F, which is a figure representing the coordinates of the teeth projected on the ground surface, based on a three-dimensional map M stored in the map storage unit 5201 and the coordinates of the teeth of the bucket 133 specified by the work equipment posture specification unit 5104. The teeth position figure F according to the first embodiment includes a lower projection line F1 which is obtained by projecting the teeth in a vertically downward direction on the three-dimensional map M, a lower extension line F2 which is obtained by extending the lower projection line F1 in a swinging direction of the swing body 120 along the ground surface, a lower auxiliary line F3 which connects the teeth to the lower projection line F1, a front projection line F4 which is obtained by projecting the teeth to the front of the work equipment on the three-dimensional map M, a front extension line F5 which is obtained by extending the front projection line F4 in an extending direction thereof along the ground surface, and a front auxiliary line F6 which connects the teeth to the front projection line F4. It is preferable that the front projection line F4 extend in a direction perpendicular to a direction in which the lower projection line F1 extends. The teeth position figure generation unit 5106 obtains a teeth position image by rendering the teeth position figure F based on a parameter of the rendering camera C determined by the imaging range specification unit 5105.

The depth image generation unit 5107 generates a depth image representing a depth in the imaging range R1 based on the three-dimensional map M stored in the map storage unit 5201 and the parameter of the rendering camera C determined by the imaging range specification unit 5105. Specifically, the depth image generation unit 5107 projects a grid texture T in a planar manner from vertically above on the three-dimensional map M. The depth image generation unit 5107 obtains a depth image by rendering the three-dimensional map M, on which the grid texture T is projected, based on the parameter of the rendering camera C.

The occupied area specification unit 5108 specifies an area occupied by the work equipment 130 (occupied area) in a captured image based on the posture of the work equipment 130 specified by the work equipment posture specification unit 5104. For example, the occupied area specification unit 5108 disposes known three-dimensional shapes of the boom 131, the arm 132, and the bucket 133 in a virtual space based on the coordinates and absolute angles of the tips of the boom 131, the arm 132, and the bucket 133 specified by the work equipment posture specification unit 5104. The occupied area specification unit 5108 obtains a work equipment image by rendering the three-dimensional shapes of the boom 131, the arm 132, and the bucket 133 based on the parameter of the rendering camera C. The occupied area specification unit 5108 specifies an area where the boom 131, the arm 132, and the bucket 133 appear in the obtained work equipment image as the occupied area.

Figure 6:
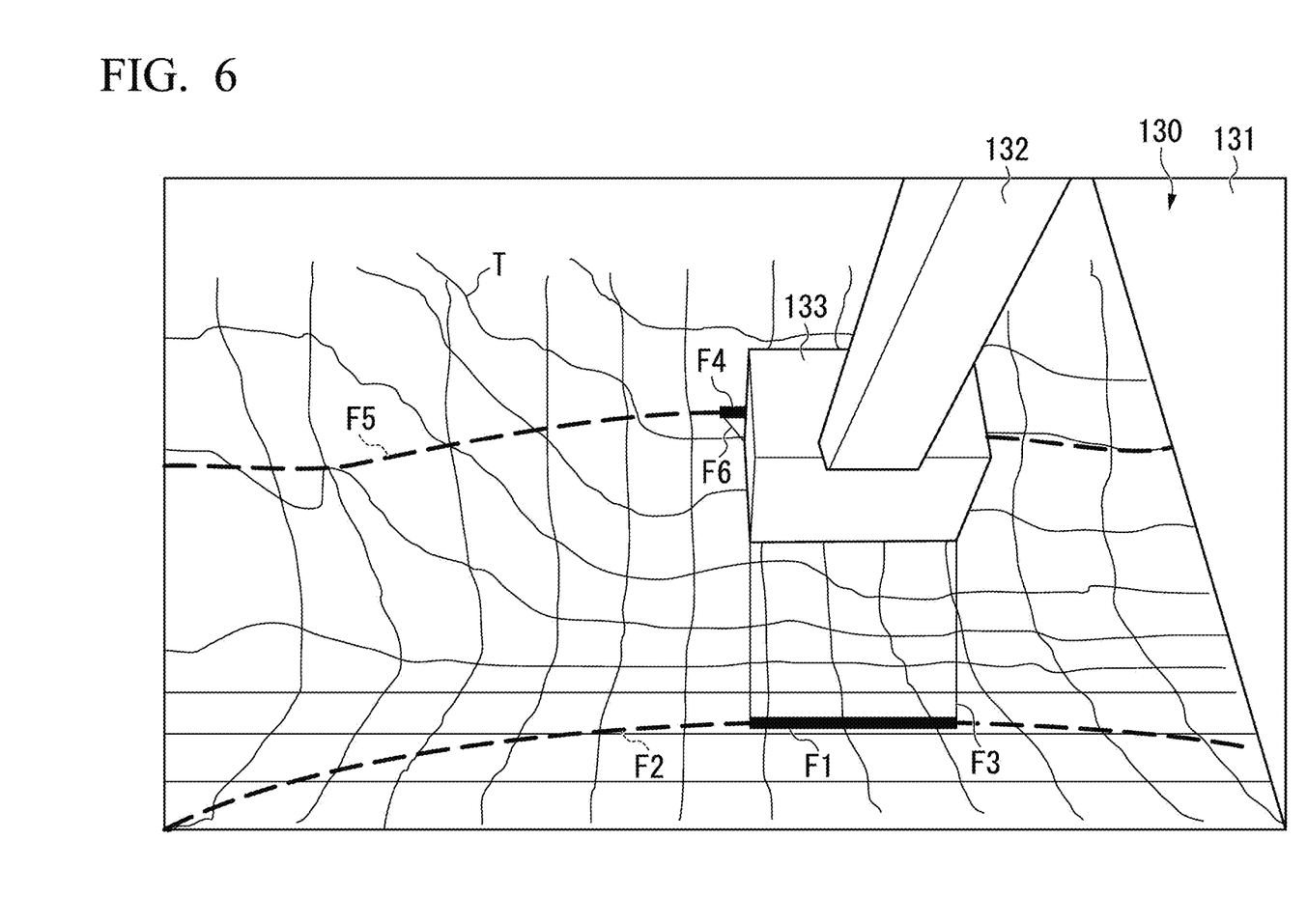
FIG. 6 is a view illustrating an example of a display image according to the first embodiment.

FIG. 6 is a view illustrating an example of a display image according to the first embodiment.

The display image generation unit 5109 generates a display image for being displayed on the display device 520 by combining the received captured image, depth image, and teeth position image. Specifically, the display image generation unit 5109 generates a display image through the following procedures. The display image generation unit 5109 deletes a portion related to the occupied area from the teeth position image and the depth image. The display image generation unit 5109 generates a display image by combining the teeth position image and the depth image, from which the portion related to the occupied area is deleted, with the captured image received by the detection information acquisition unit 5101. As illustrated in FIG. 6, the work equipment 130, a construction target, the grid texture T, and the teeth position figure F appear in the display image.

By deleting the portion related to the occupied area from the teeth position image and the depth image, the grid texture T and the teeth position figure F are not displayed in a portion corresponding to the work equipment 130 on a display screen. Accordingly, the display device 520 can display a screen that is easy for a worker to view.

The display control unit 5110 outputs a display signal for displaying a display image to the display device 520.

The operation signal input unit 5111 receives input of an operation signal from the operation device 530. The operation signal includes a traveling operation signal of the travel body 110, a swing operation signal of the swing body 120, a vertical operation signal of the boom 131, a push or pull operation signal of the arm 132, and a rotating operation signal of the bucket 133.

The operation signal output unit 5112 outputs the operation signal input to the operation signal input unit 5111 to the work machine 100.

<<Display Control Method>>

Figure 7:
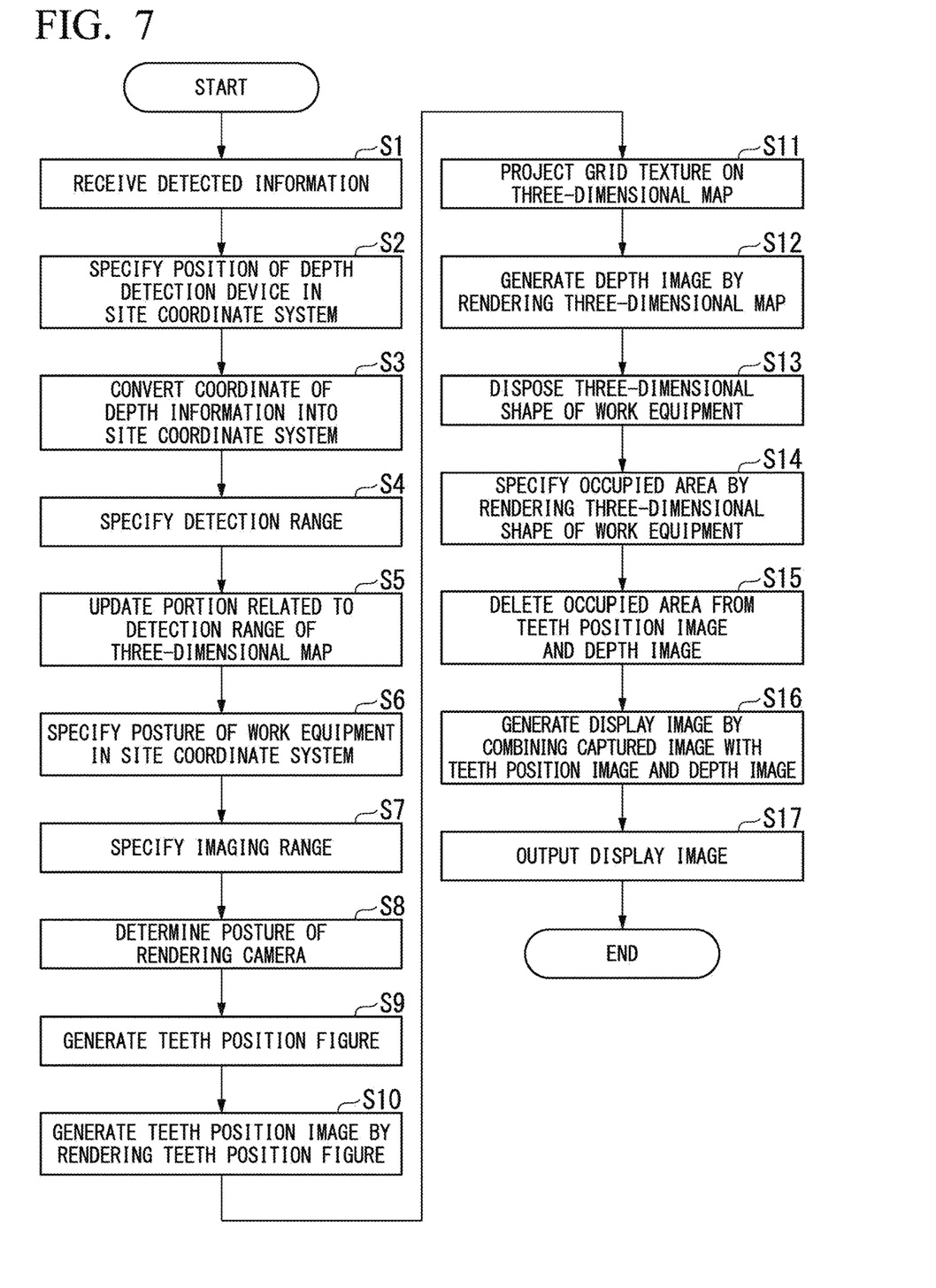
FIG. 7 is a flowchart showing display control processing performed by the control device of the remote operation room according to the first embodiment.

FIG. 7 is a flowchart showing display control processing performed by the control device of the remote operation room according to the first embodiment.

When the remote operation of the work machine 100 by the remote operation room 500 starts, the control device 540 executes the display control processing shown in FIG. 7 at regular time intervals.

The detection information acquisition unit 5101 receives, from the control device 127 of the work machine 100, an image captured by the imaging device 122, the position, azimuth direction, and inclination angle of the swing body 120, inclination angles of the boom 131, the arm 132, and the bucket 133, the traveling speed of the travel body 110, and depth information detected by the depth detection device 126 (Step S1). Next, the coordinate conversion unit 5102 specifies a position of the depth detection device 126 in the site coordinate system, an azimuth direction in which the optical axis faces, and the inclination angle of the optical axis based on the received position, azimuth direction, and inclination angle of the swing body 120 (Step S2). Since the depth detection device 126 is fixed to a prescribed place of the swing body 120, the coordinate conversion unit 5102 can specify a posture of the depth detection device 126 based on the posture of the swing body 120 by calculating a predetermined offset and rotation. The coordinate conversion unit 5102 converts the coordinate system of the received depth information into the site coordinate system based on the position of the depth detection device 126 in the site coordinate system, the azimuth direction in which the optical axis faces, and the inclination angle of the optical axis (Step S3).

The map generation unit 5103 specifies a portion corresponding to the detection range R2, of the three-dimensional map stored in the map storage unit 5201, based on the position of the depth detection device 126 in the site coordinate system, the azimuth direction in which the optical axis faces, and the inclination angle of the optical axis, which are specified in Step S2 (Step S4). That is, the map generation unit 5103 specifies a range within the known angle of view, of which center is the optical axis from the position of the depth detection device 126, in the three-dimensional map stored in the map storage unit 5201 as the detection range R2. The map generation unit 5103 updates a value of the three-dimensional map in the specified range to a value represented by the depth information converted into the site coordinate system (Step S5).

The work equipment posture specification unit 5104 specifies a posture of the work equipment 130 in the site coordinate system based on the inclination angles of the boom 131, the arm 132, and the bucket 133 and the position, the azimuth direction, and inclination angle of the swing body 120 (Step S6). The imaging range specification unit 5105 specifies the imaging range R1 of the imaging device 122 based on the posture information of the swing body 120 (Step S7). The imaging range specification unit 5105 determines a parameter of the rendering camera C in a virtual space based on the imaging range R1 (Step S8).

The teeth position figure generation unit 5106 generates the teeth position figure F based on the three-dimensional map M stored in the map storage unit 5201 and coordinates of the teeth of the bucket 133 specified by the work equipment posture specification unit 5104 (Step S9). The teeth position figure generation unit 5106 generates a teeth position image by rendering the teeth position figure F based on the parameter of the rendering camera C determined in Step S8 (Step S10).

The depth image generation unit 5107 projects the grid texture T in a planar manner from vertically above on the three-dimensional map M (Step S11). The depth image generation unit 5107 generates a depth image by rendering the three-dimensional map M, on which the grid texture T is projected, based on the parameter of the rendering camera C determined in Step S8 (Step S12).

The occupied area specification unit 5108 disposes known three-dimensional shapes of the boom 131, the arm 132, and the bucket 133 in the virtual space based on the coordinates and absolute angles of the tips of the boom 131, the arm 132, and the bucket 133 specified by the work equipment posture specification unit 5104 (Step S13). The occupied area specification unit 5108 specifies an occupied area, in which the work equipment 130 appears, in an image by rendering the three-dimensional shapes of the boom 131, the arm 132, and the bucket 133 based on the parameter of the rendering camera C determined in Step S8 (Step S14). In the work machine 100 according to another embodiment, part of the travel body 110 appears in the image depending on a swinging angle in some cases. In this case, the occupied area specification unit 5108 may further dispose a known three-dimensional shape of the travel body 110 in the virtual space to specify an occupied area of the image, in which the travel body 110 and the work equipment 130 appear. In addition, in the work machine 100 according to another embodiment, part of the swing body 120 (pillars or handrails of a passage) appears in the image in some cases. Since the imaging device 122 is fixed to the swing body 120, a position of the swing body 120 that appears in the image does not change depending on a posture of the work machine 100. In this case, the occupied area specification unit 5108 may further specify a known occupied area of the image, in which part of the swing body 120 appears.

The display image generation unit 5109 deletes a portion related to the occupied area specified in Step S14 from the teeth position image generated in Step S10 and the depth image generated in Step S12 (Step S15). Next, the display image generation unit 5109 generates a display image by combining the teeth position image and the depth image, from which the portion related to the occupied area is deleted, with the captured image received by the detection information acquisition unit 5101 (Step S16). Then, the display control unit 5110 outputs a display signal for displaying the display image to the display device 520 (Step S17).

Accordingly, the display image illustrated in FIG. 6 is displayed on the display device 520.

Operation and Effects

The control device 540 repeatedly executes the above-described processing. The operator repeatedly swings the swing body 120 between the excavation position and the loading position for the excavation and loading work. As a result, the three-dimensional map stored in the map storage unit 5201 is updated to the latest state each time the swing body 120 performs swinging.

The work machine 100 according to the first embodiment is a hydraulic excavator. In the excavation and loading work which is a typical operation of a hydraulic excavator, after the excavation at the excavation position, the earth is loaded into the transport vehicle by swinging about 90 degrees. Therefore, in the first embodiment, the control device 540 can detect the depth information around the excavation position among the construction targets by the depth detection device 126 disposed on the side surface without being interrupted by the work equipment 130 at the time of loading. Further, the control device 540 can detect the depth information on the transport vehicle side by the other depth detection device 126 without being interrupted by the work equipment 130 at the time of excavation.

Further, the depth detection device 126 is provided so that the depth detection is not interrupted by the work equipment 130. Therefore, the work system 1 according to the first embodiment can cause the display device 520 to display a depth image representing a depth of a shadow part of the work equipment 130.

Figure 8:
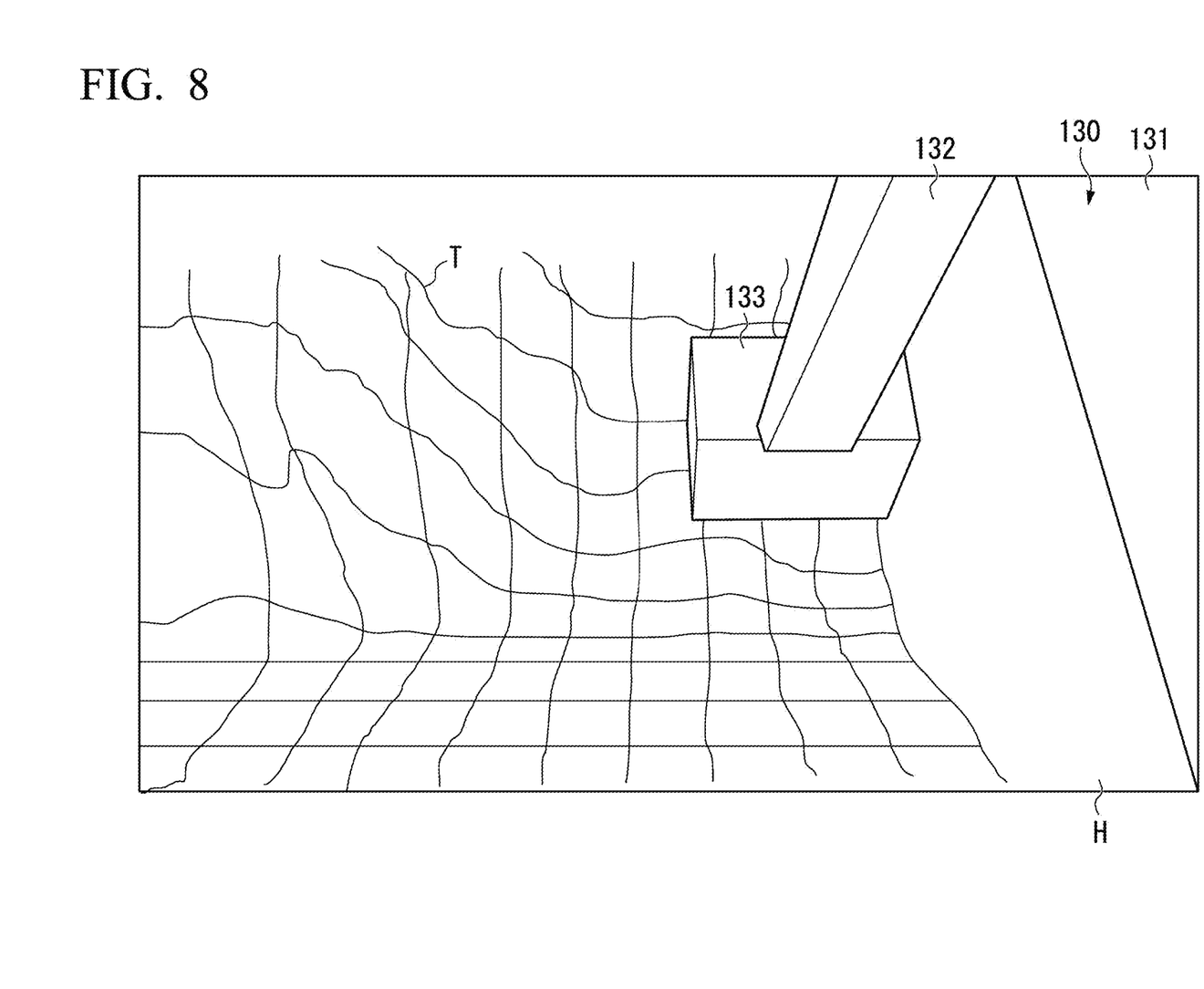
FIG. 8 is a diagram illustrating an example of a display image according to a comparative example.

FIG. 8 is a diagram illustrating an example of a display image according to a comparative example. Here, a comparative example in which the depth detection device 126 is provided in a front portion of the swing body 120 alongside the imaging device 122 will be described. The imaging device 122 is installed so that the work equipment 130 is included in the imaging range R1. Therefore, the work equipment 130 is also included in the detection range R2 of the depth detection device 126 according to the comparative example. At this time, as shown in FIG. 8, the depth detection device 126 cannot detect the depth of a portion H that is in a shadow of the work equipment 130. On the other hand, as shown in FIG. 6, the first embodiment can display the depth image representing the depth even in a portion that is in a shadow of the work equipment 130.

As described above, according to the first embodiment, the operator can also have a sense of perspective in a range in the vicinity of the work equipment 130, and the work efficiency can be improved.

In addition, in the display device 520 according to the first embodiment, a display image in which a captured image captured by the imaging device 122 provided in a portion in which the work equipment 130 is included in the imaging range and the depth image are superimpose is displayed. Accordingly, while the operator visually recognizes the scenery of the actual construction site, the operator can recognize a sense of perspective of said construction site.

Further, the depth detection device 126 according to the first embodiment is provided on a side surface of the work machine 100. As a result, the depth in the direction facing the front portion of the work machine 100 can be measured in accordance with the swinging of the swing body 120.

Further, the depth detection device 126 according to the first embodiment is provided on both side surfaces of the work machine 100. As a result, it possible to measure the depth in the direction facing the front portion of the work machine 100 for both the right swing and the left swing of the swing body 120 to the loading position.

Although one embodiment has been described in detail with reference to the drawings hereinbefore, a specific configuration is not limited to the description above, and various design changes are possible.

Although display information according to the embodiments described above is a combination of a captured image and a depth image, the display information is not limited thereto. For example, the display information according to another embodiment may include the three-dimensional map M instead of the captured image, and computer graphics generated from a model of the work machine 100.

Although the control device 540 according to the embodiments described above separately generates a teeth position image and a depth image, the invention is not limited thereto. For example, the control device 540 according to another embodiment may generate a depth image in which the grid texture T and the teeth position figure F appear by rendering the three-dimensional map M, on which the grid texture T is projected, and the teeth position figure F together.

In addition, although the control device 540 according to another embodiment superimposes the teeth position image and the depth image on the captured image, the invention is not limited thereto. For example, the control device 540 according to another embodiment may superimpose only one of the teeth position image and the depth image on the captured image. Since the teeth position image is an image representing a depth, which is generated based on the three-dimensional map M, the teeth position image is also an example of the depth image.

The teeth position figure F according to another embodiment may not necessarily have to include all of the lower projection line F1, the lower extension line F2, the lower auxiliary line F3, the front projection line F4, the front extension line F5, and the front auxiliary line F6. In addition, the teeth position figure F according to another embodiment may be another figure. For example, the teeth position figure F may be another figure such as a bucket shadow figure obtained by projecting the shape of the bucket 133, or a teeth center plot obtained by projecting a center point of the teeth of the bucket 133.

Although the control device 540 according to the embodiments described above removes a portion related to an occupied area from a teeth position image and a depth image to superimpose on a captured image, the invention is not limited thereto. For example, the control device 540 according to another embodiment may generate a display image by superimposing on the captured image without removing the portion related to the occupied area from the teeth position image and the depth image. In this case, the teeth position figure F hidden by the work equipment 130 and the grid texture T representing a depth are drawn also in a portion of the captured image, in which the work equipment 130 appears. Accordingly, the operator can have a sense of perspective even with respect to a portion hidden by the work equipment 130.

Although the control device 540 functions as the display control device in the embodiments described above, the invention is not limited thereto. For example, in the work system 1 according to another embodiment, the control device 127 may function as the display control device. That is, in the work system 1 according to another embodiment, the control device 127 may generate a depth image and display the depth image on the display device 520 of the remote operation room 500. In addition, in another embodiment, the display control device may be provided separately from the work machine 100 and the remote operation room 500. In addition, in another embodiment, some functional units of the display control device may be provided in the remote operation room 500, and the remaining functional units may be provided in the work machine 100. In this case, the display control device is realized by a combination of the work machine 100 and the remote operation room 500.

According to the present invention, the display control system can display the depth image representing a depth of the construction target in the range including the work equipment.

The invention claimed is:

1. A display control system comprising:
a work machine including a swing body, work equipment, a depth detection device, and a posture detection device; and
a display control device including a processor and a storage storing program instructions,
the processor being configured to execute the program instructions to
acquire depth information from the depth detection device provided to detect both sides of the work machine and configured to detect a depth during swinging, the depth being a distance between the depth detection device and a surrounding object including at least a construction object;
acquire posture information from a posture detection device configured to detect a posture of the work machine;
generate a three-dimensional map representing a shape around the work machine based on the acquired depth information generated by the depth detection device and the acquired posture information generated by the posture detection device;
generate a depth image representing a depth of a range including the work equipment in the three-dimensional map; and
output a display signal to display the depth image,
in excavation and loading work that repeatedly swings the swing body between an excavation position and a loading position, the depth detection device disposed on one side of the both sides of the swing body detecting, at a time of loading, the depth information around the excavation position, and the depth detection device disposed on the other side of the both sides of the swing body detecting, at a time of excavation, the depth information on a transport vehicle side.

2. The display control system according to claim 1, wherein
the work machine further includes an imaging device provided in a portion in which the work equipment is included in the imaging range,
the processor being further configured to execute the program instructions to
generate the depth image representing a depth related to the imaging range; and
output the display signal to display an image in which the depth image is superimposed on a captured image captured by the imaging device.

3. The display control system according to claim 1, wherein
the work machine is a hydraulic excavator, and
in the excavation and loading work, after the excavation at the excavation position, the work machine loads earth into a transport vehicle by swinging approximately 90 degrees.

4. A display control device comprising:
a processor and a storage storing program instructions;
the processor being configured to execute the program instructions to
acquire depth information at a plurality of timings from a depth detection device, the depth detection device being provided to detect both sides of a work machine and configured to detect a depth during swinging, the depth being a distance between the depth detection device and a surrounding object including at least a construction object;
acquire posture information of the work machine related to the plurality of timings;
generate a three-dimensional map representing a shape around the work machine based on the acquired depth information and the acquired posture information;
generate a depth image representing a depth of a range including the work equipment in the three-dimensional map; and
output a display signal to display the depth image,
the plurality of timings of acquiring the depth information being a time of loading and a time of excavation in excavation and loading work that repeatedly swings a swing body of the work machine between an excavation position and a loading position, the depth detection device disposed on one side of the both sides of the swing body detecting, at a time of loading, the depth information around the excavation position, and the depth detection device disposed on the other side of the both sides of the swing body detecting, at a time of excavation, the depth information on a transport vehicle side.

5. The display control device according to claim 4, wherein
the processor is further configured to execute the program instructions to
acquire a captured image from an imaging device provided in the work machine, the imaging device being provided in a portion in which the work equipment is included in an imaging range;
generate the depth image representing a depth related to the imaging range; and
output the display signal to display an image in which the depth image is superimposed on the captured image.

6. A display control method comprising:
acquiring depth information at a plurality of timings from a depth detection device, the depth detection device being provided to detect both sides of a work machine and configured to detect a depth during swinging, the depth being a distance between the depth detection device and a surrounding object including at least a construction object;
acquiring posture information of the work machine related to the plurality of timings;
generating a three-dimensional map representing a shape around the work machine based on the acquired depth information and the acquired posture information;
generating a depth image representing a depth of a range including the work equipment in the three-dimensional map; and
displaying the depth image,
the plurality of timings of acquiring the depth information being a time of loading and a time of excavation in excavation and loading work that repeatedly swings a swing body of the work machine between an excavation position and a loading position, the depth detection device disposed on one side of the both sides of the swing body detecting, at a time of loading, the depth information around the excavation position, and the depth detection device disposed on the other side of the both sides of the swing body detecting, at a time of excavation, the depth information on a transport vehicle side.

7. A display control system comprising:

a work equipment provided in a front portion of a swing body;

an imaging device provided in the swing body and configured to capture an image of a front of the swing body including at least part of the work equipment;

a depth detection device provided on both sides of the swing body and configured to detect a depth of a side of the swing body; and a display control device including a processor and a storage storing program instructions, the processor being configured to execute the program instructions to
   acquire depth information from the depth detection device and configured to detect a depth during swinging, the depth being a distance between the depth detection device and a surrounding object including at least a construction object; and
   output a display signal to display by superimposing a depth image generated based on the acquired depth information detected by the depth detection device on a captured image captured by the imaging device, in excavation and loading work that repeatedly swings the swing body between an excavation position and a loading position, the depth detection device disposed on one side of the both sides of the swing body detecting, at a time of loading, the depth information around the excavation position, and the depth detection device disposed on the other side of the both sides of the swing body detecting, at a time of excavation, the depth information on a transport vehicle side.

* * * * *